Patented June 6, 1939

2,161,401

UNITED STATES PATENT OFFICE 2,161,401

CHEESE PRODUCT AND PROCESS OF PLASTICIZING

Charles Doering and W. Kedzie Teller, Chicago, Ill., assignors to Henry H. Doering, Chicago, Ill.

No Drawing. Application September 25, 1936, Serial No. 102,487

15 Claims. (Cl. 99—117)

This invention relates to cheese plasticizing substances and more particularly to a method of processing cheese with nutritious emulsifiers. This application is a continuation in part to our co-pending application Serial Number 62,138 and filed February 3, 1936.

It contemplates more especially the provision of a new cheese plasticizing substance possessing food nutrition rather than purely chemical characteristics of the type that have heretofore been largely, if not entirely, thought necessary for plasticizing or emulsifying cheese during the pasteurization thereof in the production of so-called "process cheese."

This processing consists in the subjection of cheese to heat of sufficiently high temperature to destroy undesirable bacteria, but not sufficiently high to disintegrate the cheese into its component elements of casein and olein. This treatment usually prescribes that the cheese is kept at a temperature from about 140° F. to 175° F. for a short duration of time during which the cheese is actively stirred. Another process prescribes the subjection of the cheese to a friction pressure reaction which develops heat of pasteurization incident to the frictional reaction on the casein constituent of the cheese.

Irrespective of the method of processing, however, the desired resultant is the pasteurization of the cheese so as to greatly reduce its tendency to deteriorate and, further, to improve the texture, body, slicing qualities and appearance of the cheese. In some cases, different kinds of cheese are blended during the processing to impart improved flavor and more uniform and homogeneous textures as well as keeping qualities. Also, in the case of Camembert, brick and other cheese of extremely soft consistency, it is advantageous to blend a firmer cheese with the soft cheese to obtain a cheese of firmer body which can be more effectively emulsified, packed, sliced and processed for marketing purposes.

In the processing of cheese by one process or another, the cheese is reduced to a plastic state approaching liquidity, and the fat constituent of the cheese has a tendency to become separated from the casein, thereby disintegrating the product and impairing the desired texture thereof in its normal state. This tendency has heretofore been overcome by incorporating therein a small amount of an emulsifying salt of a chemical character during or prior to the processing thereof for effecting pasteurization. In this manner, a pasteurized cheese product is produced with uniform and homogeneous texture. Chemicals have been commonly used as emulsifying agents for this purpose.

Non-nutritious chemicals have largely, if not entirely, been heretofore regarded as only satisfactory for this purpose. It has long been known in scientific literature that alkaline substances are solvents for casein. Since the emulsification of cheese involves the plasticizing or rendering soluble the casein constituent of cheese so that the olein or fatty cheese constituent will be miscible therewith, any number of chemical substances have been used to give satisfactory emulsifying results.

One object of the present invention is to provide a nutritious food substance to serve as a cheese emulsifier that renders the casein and olein constituents of cheese miscible incident to the pasteurization of cheese.

Another object is to provide an improved dietary composition that renders it possible to pasteurize cheese and improve the homogeneity, texture, slicing and keeping qualities thereof.

Still another object is to provide a nutritious oil composition to serve as a cheese emulsifier effective incident to the pasteurization of cheese.

A further object is to provide a process of emulsifying and pasteurizing cheese by resort to a highly nutritious plasticizing composition having oil and flour as primary constituents.

A still further object is to provide an edible nutritious plasticizing substance for cheese which is primarily of a non-chemical character.

Still a further object is to provide an edible nutritious substance for cheese that has an oil base intermixed with a soya derivative to constitute an emulsifier constituent for cheese to effect the plasticizing thereof incident to pasteurization.

Other objects and advantages will appear from the following description of an illustrative embodiment of the present invention.

In the production of process cheese, some chemical expedient is usually employed for changing its normally insoluble casein constituent into a more soluble or plastic state prior or during the pasteurization thereof. The purpose therefor is to render the casein constituent of young cheese miscible with its fat or olein constituent in the presence of water to provide an emulsified pasteurized cheese having the desired moisture content within the limits prescribed by law.

The present invention specifically involves a new principle of emulsifying cheese to impart thereto the desired body, texture, homogeneity, slicing quality, nutritive value, keeping qualities and emulsification. It has been found that by creating a stable nutritious emulsion possessing dietetic characteristics and incorporating such with a finely ground natural cheese prior to or simultaneous with the cheese to pasteurizing temperatures in accordance with known processes, the product resulting after molding and cooling in preformed packages has a texture which enables it to be readily sliced, consumed and used in a most acceptable and delectable manner.

It is preferred to form a preliminary emulsion by adding to an edible substance such as soya bean flour, a suitable amount of water, a small proportion of an alkali, and then by means of violent agitation incorporating a fatty substance such as corn, butter, fat, cotton, peanut or other edible oils therein to provide a thorough and complete cheese emulsifying composition. The preferred constituents and their proportions which have been found desirable though not absolutely essential, are as follows:

| | | |
|---|---|---|
| Soya flour | lb | 1 |
| Water | lb | 1 |
| Corn oil | lbs | 1½ |
| Caustic potash | oz | 1 |

The flour is placed in a container and the caustic potash dissolved in water is added thereto in such a manner that the flour is intimately mixed with the caustic potash to form a thin paste. The oil is then added in small amounts while the entire mixture is being violently agitated with a propeller type or other suitable mixing device until the resultant product is a smooth, uniform emulsion similar in consistency to a salad dressing. To stabilize this emulsion and render such of exceedingly fine texture, the resultant mixture is boiled at a temperature range between 180° F. and 200° F. During this step of boiling, the composition is preferably stirred actively. The time of boiling may vary depending upon conditions, but under ordinary circumstances a quantity of twenty gallons of said composition should be subjected to the aforesaid temperature range for about one and one-half hours.

The above described emulsion is then added to one hundred pounds (100) of finely ground cheese together with sufficient water to adjust the moisture content to that permitted by law. These ingredients are thoroughly mixed for several minutes by agitating in a machine similar to a common dough mixer or other suitable device designed for that purpose. The resulting cheese product is then ready for final emulsification and pasteurization. This may then be accomplished either in the customary manner of heating and stirring in an open kettle at a temperature between 140 and 150° F. as prescribed in the Kraft Reissue Patent 14,777 until such a time as a smooth, homogeneous product results or by passing through a pasteurizing machine such as described in the Baumgartner et al. Letters Patent Number 1,997,032.

In certain types of aged cheese wherein more acidity is desired, we have found that the addition of a dibasic salt of citric acid having an acid reaction to litmus such as diammonium citrate may be advantageously used with the above recited ingredients. When diammonium citrate is used, the constituents and their proportions are substantially as follows:

| | | |
|---|---|---|
| Soya flour | lb | ½ |
| Water | lb | ½ |
| Corn oil | lb | ¾ |
| Caustic potash | oz | ½ |
| Diammonium citrate | lb | 1 |

At such time as the product becomes plastic and uniform in consistency owing to the pasteurization thereof, it may be transferred by pouring into a preformed container so that after sealing and cooling it is ready for marketing and use. With the teachings of the present invention, it is possible to emulsify and pasteurize cheese and render such acceptable to the trade as government defined "process cheese" without introducing materials which are chemical adulterants and non-edible in character. The resultant product contains only readily digestible nutritious substances rather than chemically adulterated pasteurized cheese.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

We claim:

1. An article of manufacture comprising cheese plasticized with a pre-boiled mixture of a fatty oil and soya flour admixed therewith in the presence of water and a small amount of caustic potash serving as an emulsifier therefor.

2. A cheese product plasticized between the range of 180° F. and 200° F. with an emulsified composition of soya flour, a fat oil, and water serving as an emulsifier.

3. A cheese product plasticized with an emulsified composition of soya flour, a fatty oil, caustic potash, water and diammonium citrate serving as an emulsifier therefor.

4. A method of processing cheese which consists in adding to cheese a small amount of a pre-boiled mixture of soya flour and an emulsified edible oil, heating the mass to a temperature that is sufficiently high to effect pasteurization but not sufficiently high to disintegrate the cheese, and then packaging the cheese in containers of predetermined size for storage and marketing.

5. A method of processing cheese which consists in adding to cheese a small amount of a pre-heated mixture of an edible soya bean flour emulsified with corn oil, heating the mass to a temperature that is sufficiently high to effect pasteurization but not sufficiently high to disintegrate the cheese, and then packaging the cheese in containers of predetermined size for storage and marketing.

6. A method of processing cheese which consists in adding to cheese a small amount of soya flour, corn oil, diammonium citrate, and water in the form of an emulsified composition, heating the mass to a temperature that is sufficiently high to effect pasteurization but not sufficiently high to disintegrate the cheese, and then packaging the cheese in containers of predetermined size for storage and marketing.

7. A method of processing cheese which consists in adding to cheese a small amount of soya flour, an edible oil, water and caustic potash in the form of a pre-boiled emulsified substance, heating the mass to a temperature that is sufficiently high to effect pasteurization but not sufficiently high to disintegrate the cheese, and then packaging the cheese in containers of predetermined size for storage and marketing.

8. A method of processing cheese which consists in adding to cheese a small amount of an edible pre-boiled mixture of soya bean flour and a fatty oil with water in the form of an emulsified composition, stirring and simultaneously heating the mass to a temperature that is sufficiently high to effect pasteurization but not sufficiently high to disintegrate the cheese, and then packaging the cheese in containers of predetermined size for storage and marketing.

9. A method of preparing cheese by incorporating therein a plasticizing substance which consists in thoroughly mixing edible soya bean flour, edible oil, diammonium citrate, and water, then subjecting the mixture to an elevated temperature for a period sufficient to create a uniform and stable cheese emulsifying substance, and then incorporating said plasticizing substance into a cheese product.

10. A method of preparing cheese by incorporating therein a plasticizing substance which consists in thoroughly mixing edible soya bean flour, edible oil, caustic potash, water and then subjecting the mixture to an elevated temperature between 180° F. and 200° F. for a period sufficient to create a uniform cheese emulsifying substance, and then incorporating said plasticizing substance into a cheese product.

11. A method of preparing cheese by incorporating therein a plasticizing substance which consists in thoroughly mixing edible soya bean flour, edible oil, an alkali, and water, then subjecting the mixture to an elevated pasteurizing temperature for a period sufficient to create a uniform cheese emulsifying substance, and then incorporating said plasticizing substance into a cheese product.

12. A method of preparing cheese by incorporating therein a plasticizing substance which consists in thoroughly mixing edible soya bean flour, edible oil, an alkali, and water, then while being actively stirred subjecting the mixture to an elevated pasteurizing temperature between 180° and 200° F. for a period sufficient to create a uniform cheese emulsifying substance, and then incorporating said plasticizing substance into a cheese product.

13. A method of preparing cheese by incorporating therein a plasticizing substance which consists in thoroughly mixing edible soya bean flour, edible oil, an alkali, water, and diammonium citrate; then subjecting the mixture to an elevated pasteurizing temperature between 180° and 200° F. for a period of one hour or more sufficient to create a uniform cheese emulsifying substance, and then incorporating said plasticizing substance into a cheese product.

14. An article of manufacture comprising a cheese plasticized with pulverized soya bean, an edible oil, water, and a small amount of diammonium citrate.

15. An article of manufacture comprising a cheese plasticized with a soya bean flour, an edible oil, water, caustic potash, and a small amount of diammonium citrate.

CHARLES DOERING.
W. KEDZIE TELLER.